United States Patent [19]

Hayes

[11] 4,301,133

[45] Nov. 17, 1981

[54] METHOD FOR PREPARING A CALCIUM CARBIDE PRODUCT

[75] Inventor: Edward O. Hayes, Mesa, Ariz.

[73] Assignee: National Research Development, Inc., Scottsdale, Ariz.

[21] Appl. No.: 145,306

[22] Filed: Apr. 30, 1980

[51] Int. Cl.$^3$ .............................................. C01B 31/32
[52] U.S. Cl. ................................... 423/442; 423/174; 423/441; 423/299; 48/216
[58] Field of Search ............... 423/442, 441, 174, 299, 423/304, 305; 48/216

[56] References Cited

U.S. PATENT DOCUMENTS

| | | | |
|---|---|---|---|
| 862,092 | 7/1907 | Morehead | 423/442 X |
| 862,093 | 7/1907 | Morehead | 423/442 X |
| 1,777,582 | 10/1930 | Seyfried | 423/442 X |
| 2,860,037 | 11/1958 | Kamlet | 423/442 X |

*Primary Examiner*—Edward J. Meros
*Attorney, Agent, or Firm*—Cushman, Darby & Cushman

[57] ABSTRACT

A product suitable for the production of fuel gas upon reaction with water which is prepared by reacting a uniform mixture of finely divided calcium oxide and carbon under pressure in the presence of pyrophosphoric acid.

10 Claims, No Drawings

METHOD FOR PREPARING A CALCIUM CARBIDE PRODUCT

FIELD OF THE INVENTION

The present invention relates to a method of producing a solid substance which upon contact with water liberates a gaseous fuel product. While not wishing to be so limited, it appears that the method of the present invention provides a new process for producing calcium carbide.

BACKGROUND OF THE INVENTION

Calcium carbide has long been known for its reactivity with water resulting in the evolution of acetylene gas. Heretofore, the production of calcium carbide has been carried out by directly reacting carbon with calcium oxide in an electric furnace as described by Cotton and Wilkinson, "Advanced Inorganic Chemistry", Third Edition, 216 (1972). Due to the high energy costs of such methods, the production of calcium carbide has been restricted. In addition, while the making of acetylene gas from the reaction of water with calcium carbide has long been known, such processes have been limited not only by the cost of carbide but the undesirous by-product, lime, which is formed.

Recently, an improved method for generating an acetylene base fuel gas has been described in my co-pending and concurrently executed U.S. Patent Application Ser. No. 145,304 filed Apr. 30, 1980, titled "PROCESS FOR PRODUCING AN ACETYLENE BASE FUEL GAS". With the advent of such new means of generating a relatively safe, stable energy rich acetylene based fuel gas, a more economical means for producing calcium carbide is needed.

Accordingly, it is the primary object of the present invention to provide a means of producing a substance which will react with water to produce an acetylene based fuel gas.

It is a further object of the present invention to provide an economical means for reacting calcium oxide and carbon to produce a product having the properties of calcium carbide without the use of an electric furnace.

These and other objects of the present invention will be more apparent from the description which follows.

SUMMARY OF THE INVENTION

According to the present invention, there is provided a method for the production of calcium carbide by reacting a uniform mixture of finely divided calcium oxide and carbon with pyrophosphoric acid ($H_4P_2O_7$).

At the outset, while not wishing to be limited to any theoretical or empirical explanation, it should be noted that as used herein the product "calcium carbide" refers to the product of reacting calcium oxide, carbon and pyrophosphoric acid according to the present invention, which product is believed to be composed chiefly or in total of $CaC_2$. Indeed, the calcium carbide product of the present invention readily reacts in the presence of water to generate an acetylene base fuel gas, suitable for burning in an internal combustion engine or power plant as described in my aforementioned application Ser. No. 145,304.

DETAILED DESCRIPTION OF THE INVENTION

Calcium carbide is produced by reacting a uniform mixture of finely divided calcium oxide and carbon with pyrophosphoric acid. The reaction is carried out preferably by addition of pyrophosphoric acid to the uniform mixture in an amount sufficient to form a paste like mass which under pressure results in a product which on drying is a hard mass.

Calcium oxide is readily available from limestone deposits. Suitable carbon sources include coal, coke and charcoal. Both the calcium oxide and carbon should be in a finely divided state to ensure a complete and uniform reaction. If necessary, these materials may be ground separately or in combination. Suitably, the materials are ground to about 60 mesh or finer.

After forming a uniform mixture of finely divided calcium oxide and carbon, pyrophosphoric acid is added in an amount sufficient to form a paste of the mixture (generally from 20 to 250% $H_4P_2O_7$ based on the weight of the mixture is sufficient). Upon addition of the acid, the mixture immediately begins to exotherm with the generation of water vapor.

Most suitably the acid is added to the mixture in a confined reaction space, and simultaneously or as quickly as possible after addition of the acid, the resulting paste is subjected to pressure by way of physical compaction (e.g. by a ram, disc, etc.). After the reaction is complete, as indicated by a cooling of the compacted mass, pressure is removed. After drying, one obtains a hard mass of calcium carbide, i.e. in the form of a pressed cake.

The hard mass of calcium carbide may be subjected to further processing to obtain particles or granules of desired size and shape. Preferably, the hard mass is crushed by rollers and physically treated and screened to a uniform particle size. A particularly desirable particle size is 0.25 inch mesh.

In order to enhance the capability of the calcium carbide to be stored without deterioration, it is preferred to stabilize the calcium carbide particles so as to render the same impermeable to air and moisture. This is accomplished by coating the particles of calcium carbide with a film, impervious to air and moisture, preferably composed of nitrocellulose and a polyester resin. In carrying out such a process, one merely contacts the particles of calcium carbide with a slurry of nitrocellulose and polyester resin in a suitable organic solvent such as acetone, isopropyl alcohol or mixtures thereof. After contacting the calcium carbide particles with the slurry, the excess slurry is drained and the particles may be dried, for example in a convection dryer, to yield particles having a film thereon impermeable to air and moisture. While the resulting coated particles are impermeable to air and moisture, upon contact with the aqueous liquid activator reagent of the invention described in my above mentioned application Ser. No. 145,304 the coating is broken down or dissolved and reaction occurs to generate the desired acetylene base fuel gas.

An example of a suitable slurry for coating the carbide granules is:

| | |
|---|---|
| Nitrocellulose-RS | 10% |
| Santolite (aromatic sulfonamide-formaldehyde alkyd resin) | 10% |

| -continued | |
|---|---|
| Dibutylphthalate | 2% |
| Ethyl alcohol | 5% |
| Ethyl acetate | 34% |
| Toluene | 39% |
| | 100% |

The following example is offered to more fully illustrate the invention, but is not to be construed as limiting the scope thereof.

EXAMPLE

Into a stainless steel cylinder is placed a uniformly blended mixture of 56 grams of calcium oxide (60 mesh) and charcoal (60 mesh). To the mixture is added 25 grams of pyrophosphoric acid with stirring to form a pasty mass which is then compressed with a rod piston adapted to fit the inside of the reaction cylinder.

The exothermix reaction is allowed to run its course and after cooling (about 15–20 minutes) the piston is removed from the cylinder together with the hard cake of calcium carbide.

The calcium carbide so produced, after crushing to a uniform particle size of 0.25 inch mesh and placing in water, reacts to generate an acetylene base fuel gas.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

I claim:

1. A method for the production of calcium carbide which comprises reacting a uniform mixture of finely divided calcium oxide and finely divided carbon with pyrophosphoric acid under pressure.

2. A method according to claim 1, wherein said calcium oxide and carbon each have a particle size of 60 mesh or finer.

3. A method according to claim 1, wherein said carbon is derived from a source selected from the group consisting of coal, coke and charcoal.

4. A method according to claim 1, wherein stoichiometric amounts of calcium oxide and carbon are reacted.

5. A method according to claim 1, wherein the amount of pyrophosphoric acid present is sufficient to form a shape retaining paste of said mixture.

6. A method according to claim 1, wherein said mixture comprises from about 60 to 80 percent calcium oxide and 20 to 40 percent carbon.

7. A method for the production of calcium carbide which comprises the steps:
   (a) forming a uniform mixture comprising from 60 to 80 percent calcium oxide and 20 to 40 percent carbon, each having a particle size of 60 mesh or finer;
   (b) simultaneously adding to said mixture an amount of pyrophosphoric acid sufficient to form a paste of said mixture and subjecting the paste to pressure in a closed reactor; and
   (c) allowing the reaction product of step (b) to dry to a hard mass.

8. A method according to claim 7, comprising the further step (d) wherein the hard mass is subjected to crushing and screening to provide a hard granule-like product of uniform size.

9. A method according to claim 7 or 8 wherein the source of carbon is selected from the group consisting of coal, coke and charcoal.

10. A method according to claim 1 or 7 wherein the amount of pyrophosphoric acid added ranges from about 20 to 250 percent by weight of the uniform mixture.

* * * * *